United States Patent [19]
Yokana

[11] Patent Number: 4,733,970
[45] Date of Patent: Mar. 29, 1988

[54] EXTRUDER SCREW

[75] Inventor: Lucien D. Yokana, Princeton, N.J.

[73] Assignee: Sterling Extruder Corporation, South Plainfield, N.J.

[21] Appl. No.: 774,196

[22] Filed: Sep. 9, 1985

[51] Int. Cl.[4] .............................................. B29B 1/06
[52] U.S. Cl. ...................................... 366/79; 366/89; 425/208
[58] Field of Search ..................... 366/79, 81, 88, 89, 366/323, 318, 319, 342, 343; 425/207, 208, 209

[56] References Cited

U.S. PATENT DOCUMENTS

| | | | |
|---|---|---|---|
| 3,698,541 | 10/1972 | Barr | 366/88 |
| 3,867,079 | 2/1975 | Kim | 366/81 |
| 4,330,214 | 5/1982 | Willert | 366/79 |

FOREIGN PATENT DOCUMENTS

| | | |
|---|---|---|
| 1165985 | 12/1967 | United Kingdom . |
| 1279663 | 11/1969 | United Kingdom . |
| 1596009 | 4/1978 | United Kingdom . |

*Primary Examiner*—Robert W. Jenkins
*Attorney, Agent, or Firm*—Pennie & Edmonds

[57] ABSTRACT

Extruder screw having a feed section, compression section and metering section. The compression section includes two transition portions with a barrier flighted portion disposed therebetween. The screw reduces the power consumption and stock temperature of thermoplastic material.

11 Claims, 6 Drawing Figures

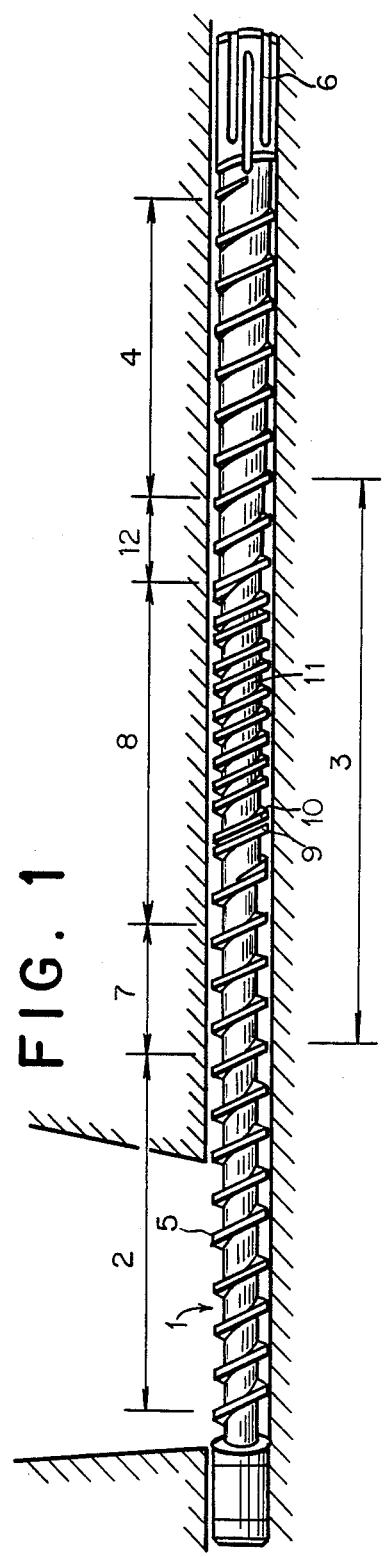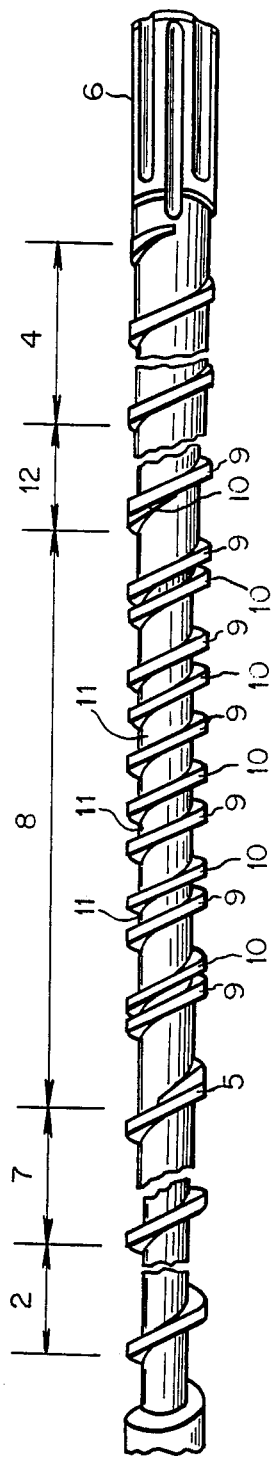
FIG. 1
FIG. 2

EXTRUDER SCREW

BACKGROUND OF THE INVENTION

1. Field of the Invention

The invention relates to the field of extruders for polymers and in particular to an improved extruder screw for extruder apparatus.

2. Description of the Related Art

The popularity of linear low density polyethylene (LLDPE) film is primarily based on its relative low cost and good mechanical properties such as tear strength, puncture resistance, tensile strength and environmental stress-crack resistance. The growth of LLDPE resin comes mostly from replacement of the polyolefin resins, low density polyethylene (LDPE) in particular.

The conversion of LDPE extruder lines to LLDPE extruder lines is not an easy proposition. LDPE screws, when used for LLDPE extrusion, require more torque and power than is available from most LDPE blown film extruder drives. This requires the LDPE extruder drive be regeared or supplied with a more powerful drive. The regeared or modified drive extruders tend to deliver melt temperatures much higher than desired for film blowing. This is due to the difference in the shear rheology of LLDPE as opposed to LDPE. LLDPE is more viscous in the range of extruder shear rates than is LDPE. Therefore it requires more energy to extrude. This energy manifests itself as increased heat causing higher temperatures.

The purpose of this invention was to develop a screw that would melt all thermoplastic materials at a lower and more controlled melt temperature, more uniform pressure and consume less power doing so.

The extruders currently used for LDPE have an elongated opening at one end of a barrel which may be heated or cooled at specified locations along its length. An extruder screw is positioned within the barrel and runs the length of the barrel. The screw has a helical thread or flight on its surface which is in close fit with the cylindrical surface of the barrel. The screw is rotated about its axis to work the plastic material and force it toward the outlet end of the extruder.

An extruder screw usually has a plurality of sections such as a metering section, a feed section and a transition section. The feed section is usually provided beneath the opening in the hopper which feeds the polymer to be extruded into the extrusion apparatus. The feed section will normally extend into the barrel of the extruder. The screw diameter, or "root", in the feed section is usually the smallest on the screw. This allows the feed section to pull large amounts of polymer powder or pellets into the extruder so they may be compressed in the forward screw portions. This overfill is desirable as the extruder obtains optimum performance when the space between two adjacent flights is completely filled with material with a minimal number of voids.

In a common extruder screw there is a transition section after the feed section. In the transition section the root increases thus decreasing the volume of space which is available for the polymer and thereby compressing it.

The transition section is followed by a metering section of constant root. A large part of the shearing and polymer melt occurs in the section as the polymer moves along the screw length.

The shearing of the material as it moves along the extruder screw through the barrel generates heat and melts the polymer. Most of the melting occurs at the barrel surface. As the polymer melts and the flight behind the polymer moves forward, the melted polymer flows down the face of the flight, forward along the root of the screw and up the back of the lead flight. This will sometimes cause a pocket of polymer solid to become encapsulated within the melted polymer pool which is flowing around the perimeter formed by the two adjacent flights, the screw surface and the barrel surface.

The conventional feed-transition-metering type of extruder screw was designed for the general extrusion of all thermoplastics. However, when the same type of extruder screw is used with LLDPE the power consumption and exit temperatures increase while maximum output or throughput decreases. In order to improve the performance of the extruder without regearing, a screw was developed having two transition sections and two metering sections. U.S. Pat. No. 4,357,291 to Miller et al. discloses such a screw. Such a screw provides a separate compression and metering section; however, there is no assurance of proper and complete melt as the solids bed may become encapsulated.

There has been proposed an extruder screw with a barrier flighted section. The barrier flight assists the extrusion process by separating the melt pool from the solids bed. This leaves the solids bed to be worked and heated to melt it.

SUMMARY OF THE INVENTION

The extruder screw and method of the invention provides a compression section which provides the polymer with a separation of the melt pool from the solid bed. At the same time, the screw of the invention reduces the power consumption of the extruder as compared with prior known extruders while maintaining or increasing throughput.

The extruder screw of the invention has a feed section associated with a multi-stage compression section followed by a metering section. The compression section has three portions, two transition portions with a barrier flighted portion disposed therebetween. The barrier flighted portion is actually comprised of two flights, a main flight and a barrier or moving flight. The barrier flight begins in the main flight and then separates from it. Thereafter it is disposed between the main flight and the flight in front of the main flight. The position of the barrier flight relative to the two surrounding flights changes at positions along the screw. The position changes to have the effect of moving the flight forward from the main flight until it connects with and blends into the forward flight.

The barrier flight is not as high as the main flight and therefore a gap between the barrel and barrier flight is provided. The melt pool flows back over the barrier while leaving the solids bed disposed between the barrier flight and the forward flight. This separates the melt pool from the solids bed and prevents unwanted encapsulation of the solids bed. The barrier flight also serves to compress the solids bed even though in one embodiment the root diameter of the screw in the barrier flighted section actually decreases. This serves to separate the melt from the solids and eliminate undesired voids in the solids bed which prevent the solids from being properly worked. This provides improved mixing and quicker melt of the polymer without excess melt temperature or increases in power consumption.

BRIEF DESCRIPTION OF THE DRAWINGS

FIG. 1 is a side elevation view of the extruder screw of the invention;

FIG. 2 is a view of the screw of FIG. 1 with portions removed;

DESCRIPTION OF THE PREFERRED EMBODIMENT

Figure 3:
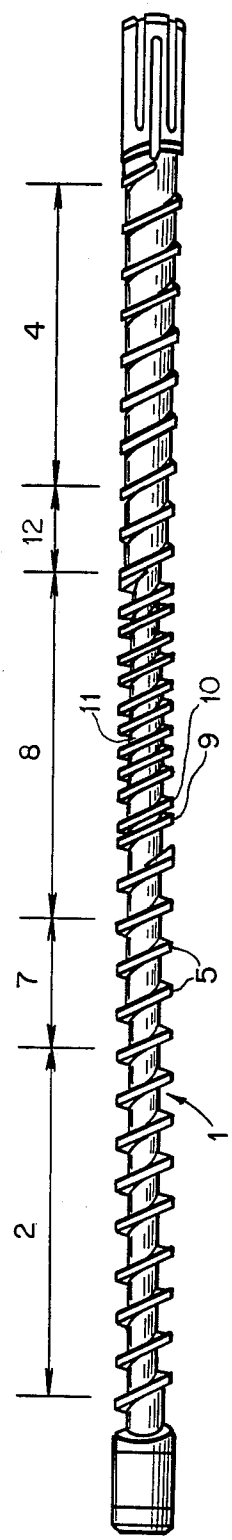
FIG. 3 is a side elevation view of an alternate embodiment of the extruder screw of the invention.

The screw 1 of the invention includes a screw body with differing root diameters as shown in FIG. 1 with the barrel represented schematically. Overall, there is a feed section 2, a compression section 3 a metering section 4 and a mixing head 6.

The screw 1 has a helical flight 5. The flight 5 is of constant pitch and outer diameter. The flight 5 terminates at a mixing head 6 of any suitable type known to those skilled in the art. In the feed section 2 the screw root diameter is the smallest of the root diameters on the screw. This provides a large zone defined by the screw root, two adjacent flight convolutions and the inner surface of the barrel. As described above, the feed section 2 is designed to receive the polymer powder or pellets for extruding. As the polymer passes along the feed section 2 it is worked by the friction and shearing caused by the relative movement between polymer, screw and barrel. This work creates heat which begins to soften and melt the solids.

The polymer then passes into the compression section 3 of the screw. The first portion in the compression section is the transition portion 7. This transition portion has a variable root diameter which increases in the direction of polymer flow. The transition portion 7 is of a length which constitutes about one-half turn or more of the flight. The root increases in size and thereby compresses the polymer slightly as it enters a barrier flighted portion 8.

The barrier flighted portion starts with a single main flight 9. A second flight called a barrier flight 10 separates from the main flight 9 and is disposed between two adjacent convolutions of the main flight 9. The barrier flight 10 is of a slightly smaller outside diameter than the main flight 9 and of a different pitch. The pitch of the barrier flight causes it to move further along the longitudinal axis of the screw per convolusion than the main flight. This allows the melt pool, that is the polymer which has already melted, to flow over the barrier and be contained in the space behind the barrier flight 10. The pitch of the barrier flight is such that its position between the two adjacent convolutions of the main flight is constantly moving toward the more forward of the two flights. This causes the space containing the solids bed to shrink while the space containing the melt pool increases thus separating the melt from the solid and eliminating voids in the solids bed which may occur. This assures that the melt pool will flow to a position behind the barrier flight leaving the solids bed segregated and unencapsulated. Because the solids bed is unencapsulated it is worked to a greater extent which creates more of a melt pool which flows over the barrier flight into the space 11 behind the barrier flight 10. If any of the solid polymer is forced over the barrier flight in solid form, it will be subject to intense shearing forces caused by the relative movement of the barrier flight 10 and the barrel. This assures that all the polymer is melted when it reaches the space 11.

Figure 4:
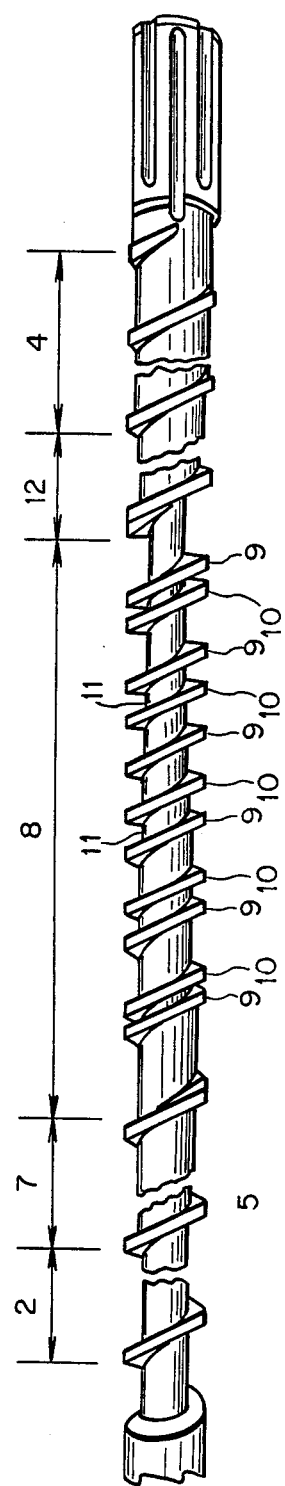
FIG. 4 is a view of the screw of FIG. 3 with portions removed.

At the end of the barrier flighted section the barrier flight joins the main flight ahead of it and space 11 becomes the space in front of the main flight between two adjacent convolutions of the main flight. In one embodiment the root diameter of the screw is constant throughout the length of the barrier flighted section. However, in an alternate embodiment (FIGS. 3 and 4) the root diameter actually decreases allowing the barrier flight to move more quickly across its path and thus providing melt over a shorter distance.

The last section in the compression portion is a second transition section 12. This transition section is similar to the first transition section 7. However, the variable root diameter in this section increases to the final, largest diameter of the screw. The rate at which the root diameter increases in the second transition section 17 may be greater than in the first transition section 7. This is especially true if the alternate embodiment is used where the root diameter actually decreases along the barrier flighted section.

The final section is a metering section 4 which may have a constant root diameter or a slightly increasing root diameter. The extruder screw terminates in a common mixing head 6.

In a preferred embodiment, the extruder screw is is two and one-half inches in diameter and has a 30:1 length to diameter ratio. It is used in a common extruder apparatus with a 50 HP, DC drive geared to a top speed of 65 RPM. The feed section is nine flight lengths long; the first transition portion is three flight lengths long; the barrier flighted portion is seven flights long with the barrier flight itself having only six flights; the second transition portion is two flight lengths long; the metering section is seven flight lenghs and the mixing head is two flight lengths long.

Alternatively, the screws may have a 24:1 length to diameter ratio. In that case, the feed section is nine flight lengths long; the first transition portion is two flight lengths long; the barrier portion is five flight lengths long with only six barrier flights; the second transition portion is two flight lengths long; the metering section is four and one-half flight lengths long; and the mixing head is one and one-half flight lengths long.

In these two examples, there are fewer barrier flights than main flights in the barrier portion. This is because the barrier flight has a greater pitch and therefor travels more of the screw length per convolusion.

Figure 5:
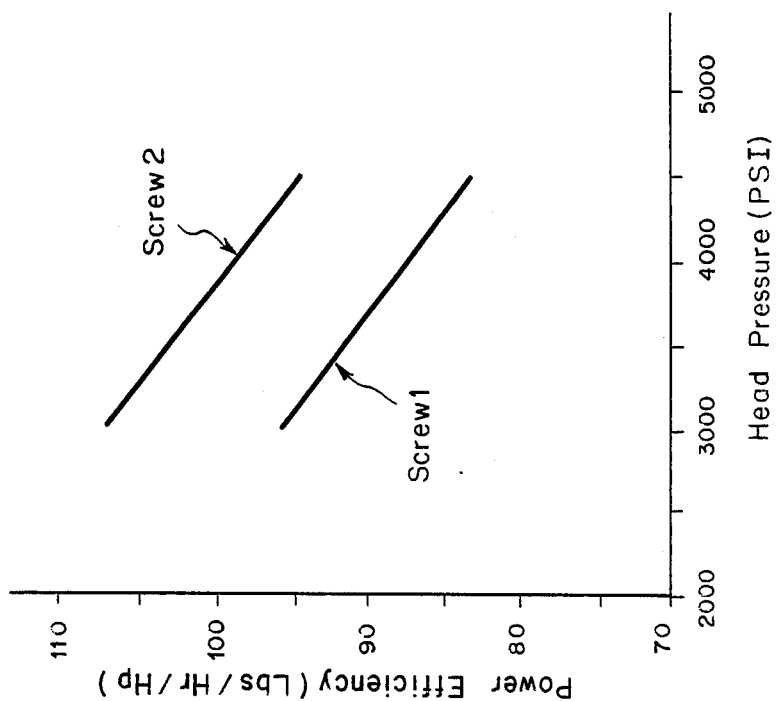
FIG. 5 is a graph showing melt temperature versus head pressure in the prior art screw and the present screw at 40 RPM.
Figure 6:
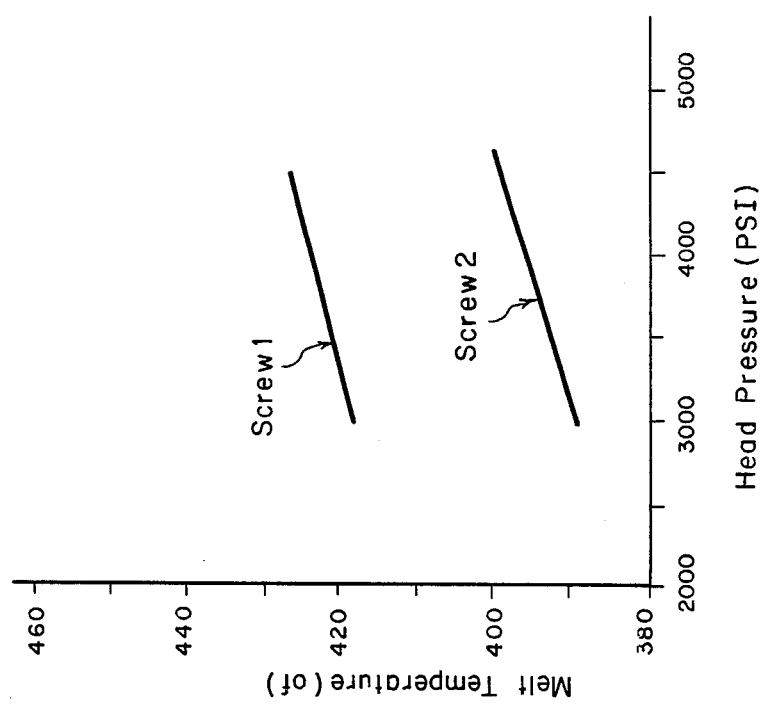
FIG. 6 is a graph comparing output of the screw of the invention to the prior art screw at 40 RPM.

FIGS. 5 and 6 compare the melt temperatures and output efficiencies of a single transition barrier screw (screw A) and the screw of the invention (screw B), when extruding LLDPE at 40 RPM. As can be seen in FIG. 5, an average decrease in stock outlet temperature of 30° is encountered by using the screw of the invention as opposed to the prior art. This indicates less energy wasted in the extruder which manifests itself as excess heat. FIG. 6 shows that there is approximately a twelve percent increase in power efficiency between the screw of the invention (avg. 9.34 lbs/hr/hp) and the prior art screw (avg. 8.33 lbs/hr/hp).

I claim:

1. An extruder screw having a helical flight of predetermined outside diameter for extruding thermoplastic materials, comprising:
   (a) a feed section having a constant screw root diameter;
   (b) a compression section which includes:
      (i) a first transition portion immediately following said feed section, wherein the screw root diameter increases in the direction of extruder throughput;
      (ii) a barrier flighted portion immediately following said first transition section wherein said flight splits to form a first main flight of non-increasing screw root diameter and a second barrier flight of such a pitch that said barrier flight and the main flight in front of it are separated by a decreasing distance along the screw in the direction of extruder throughput such that material flows backward over said barrier flight; and
      (iii) a second transition portion following said barrier flighted section wherein the screw root diameter increases in the direction of extruder throughput; and
   (c) a metering section immediately following said compression section and having a constant screw root diameter.

2. The extruder screw according to claim 1 wherein:
   (a) said barrier flight has an outside diameter less than the predetermined outside diameter of the main flight.

3. The extruder screw according to claim 2 wherein:
   (a) said first transition portion and said second transition portion increase in diameter at equal rates.

4. The extruder according to claim 3 further comprising:
   (a) a mixing head immediately following said metering section.

5. The extruder screw according to any one of the claims 1-4 wherein:
   (a) said barrier flighted section has a constant screw root diameter.

6. An extruder screw according to claim 5 wherein:
   (a) said feed section has nine flights;
   (b) said first transition portion has three flights;
   (c) said barrier flighted portion has seven flights;
   (d) said second transition portion has two flights;
   (e) said metering section has seven flights; and
   (f) the length to diameter ratio of the screw is 30:1.

7. The extruder screw according to any one of claims 1-4 wherein:
   (a) the root diameter of the barrier flighted portion decreases in the direction of extruder throughput.

8. An extruder screw according to claim 7 wherein:
   (a) said feed section has nine flights;
   (b) said first transition portion has three flights;
   (c) said barrier flighted portion has seven flights;
   (d) said second transition portion has two flights;
   (e) said metering section has seven flights; and
   (f) the length to diameter ratio of the screw is 30:1.

9. A method of extruding thermoplastic materials comprising the steps of:
   (a) introducing thermoplastic polymer solids into an extruder feed section;
   (b) compressing said polymer while working said polymer to form a melt pool portion;
   (c) separating the melted portion of said compressed polymer from the remaining solids in a barrier flighted screw section while continuing to work said solids without additional compression in said barrier flighted screw section to form additional melt portions which are thereafter separated from the solids;
   (d) further compressing said melted portion prior to extrusion.

10. The method according to claim 9 wherein:
    (a) said solids are compressed slightly while said melt portion is separated from said solids.

11. The method according to claim 10 further including:
    (a) subjecting said melt portion to further work in a metering section.

* * * * *